Figure 1:
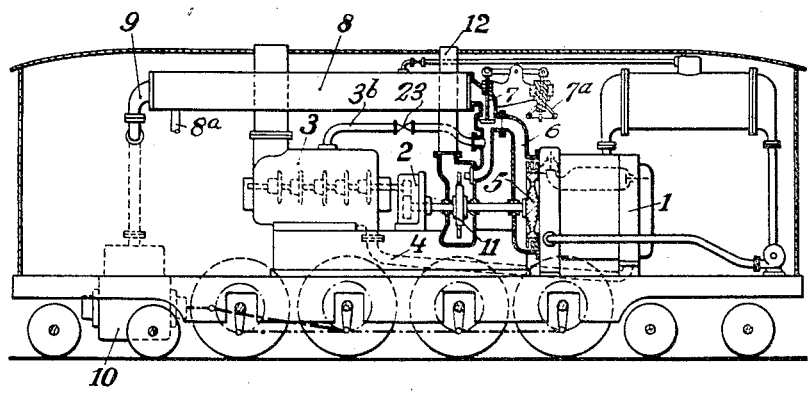

July 25, 1933.   H. HOLZWARTH   1,920,142
POWER PLANT
Filed July 18, 1931   2 Sheets-Sheet 1

Inventor
HANS HOLZWARTH
BY *Joseph Hirschman*
ATTORNEY

Patented July 25, 1933

1,920,142

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

POWER PLANT

Application filed July 18, 1931, Serial No. 551,809, and in Germany July 15, 1930.

The present invention relates to a power plant intended primarily for vehicles, and particularly for locomotives, and has for its object to provide a power plant which is efficient in operation and simple and compact in construction.

In my copending application Ser. No. 512,340, field January 30, 1931, is described a portable power plant in which an explosion turbine is arranged to operate the auxiliary machines, such as the charging air compressor, while the exhaust gases of such turbine separately develop in a continuous current turbine the power for driving the vehicle. In a portable power plant of this type, the explosion turbine is advantageously maintained in operation when the expansion machines serving directly to drive the vehicles are only partially under load or completely free from load. The partial load occurs, for example, in traveling down hill, or at moderate speed on level ground (e. g. at curves), while the complete freedom of load occurs when the vehicle is at rest, as when a locomotive has stopped in a station. According to previous proposals respecting the operation of driving mechanism of this type, the exhaust gases were in part or in whole discharged into the atmosphere when the expansion machines were relieved of part or all of their load. This mode of procedure becomes, however, uneconomical when the reduction in load occurs frequently.

According to the present invention, it is proposed to utilize the energy of the gases exhausting from the explosion turbine, which remains in constant operation, for driving the auxiliary machines, and particularly the air compressor, when the expansion machines which directly drive the vehicle are partially or completely relieved of load. The exhaust gases may, for example, be made to produce power in a continuous current turbine which is coupled with the auxiliary machines. The exhaust gases may, however, also be conducted to a heat exchanger for generating and even superheating steam, the generated or superheated steam being then conveyed to an auxiliary steam turbine coupled to one or more of the auxiliary machines. The steam space of the steam generator and/or the internal volume of the superheater may be of such increased size that a considerable quantity of steam is stored therein when the secondary engines (i. e. the engines driving the vehicle) are under partial or no load, the pressure of the steam being permitted to rise above the normal operating pressure, so that upon starting the engine a large quantity of accumulated steam is available for providing the higher starting torque. Thus the steam may be charged into a steam cylinder or other steam engine which is geared to the driving wheels of the vehicle and assists the gas-driven expansion machine in driving the vehicle. Both procedures have the advantage that the exhaust gases after their deenergization have a comparatively low velocity, so that a special muffling device is not necessary. The conduits for the exhaust gases in the heat exchanger preferably are in the form of Venturi nozzles, so that favorable conditions without harmful counterpressure are created for the heat interchange.

Figure 2:
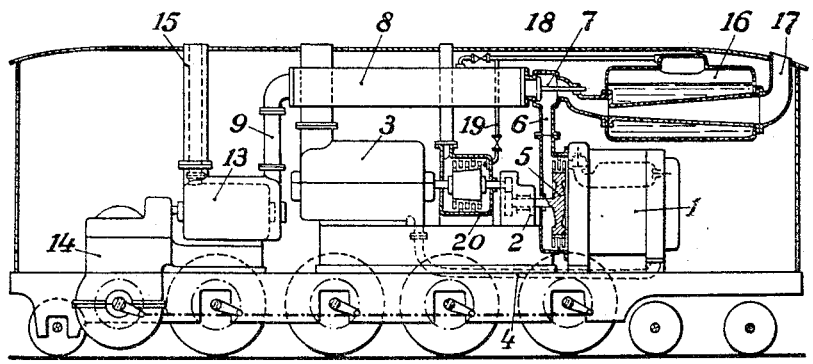
Figure 3:
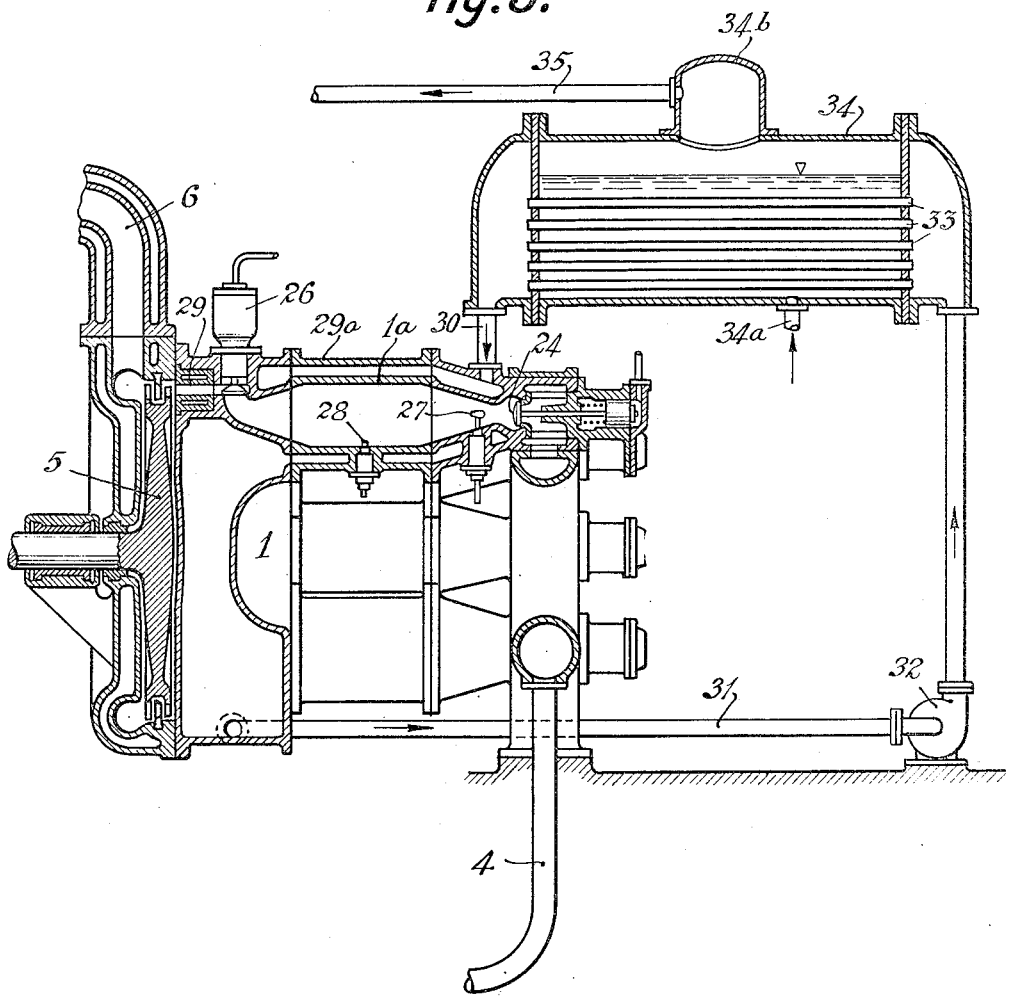

Reference is had to the accompanying drawings which illustrate two arrangements for carrying out the invention. In said drawings, Fig. 1 shows a longitudinal section through a locomotive constructed in accordance with the invention, the same illustrating a separate auxiliary continuous current gas turbine coupled with the air compressor;

Fig. 2 is a similar view of a locomotive provided with an auxiliary steam turbine; and Fig. 3 shows on an enlarged scale the construction of the explosion turbine and of the boiler receiving the waste heat thereof.

The numeral 1 indicates an explosion turbine composed of an impulse wheel 5 driven by puffs of explosion gases intermittently discharged from a plurality of constant volume explosion chambers 1a. The explosion turbine is arranged to drive an air-compressor 3 through a transmission 2. The compressed air produced by the compressor 3 is conducted to the explosion chambers of the explosion turbine 1 by conduit 4. When the vehicle is under load, the exhaust gases of the turbine 1, in whose rotor 5 of the high pressure, high temperature gases generated in the explosion chambers have given up the amount of energy required to drive the compressor 3, flow through conduit 6 and the suitably adjusted control device 7 into the heat exchanger 8, where they serve to generate or superheat steam. In the arrangement illustrated in Fig. 1, the heat exchanger 8 is in the form of a steam superheating coil.

The gases are withdrawn from the heat exchanger by pipe 9 and are than charged into the locomotive cylinder 10 where they develop the power for directly driving the vehicle. The control device 7 may be operated either manually, as by a hand wheel 7a, or automatically, as by a governor.

When the locomotive cylinders 10 are under only partial load, as for example when the locomotive is travelling down hill or at moderate speed on level ground, or when the cylinders are under no load at all, as when the locomotive is at rest in a station, there arises the necessity of disposing of the exhaust gases of the explosion turbine 1, which is preferably maintained in constant operation. The discharge of the exhaust gases directly into the atmosphere has the disadvantage of poor economy; according to the invention it is proposed to charge the exhaust gases into the continuous current gas turbine 11 by suitable adjustment of the control device 7. The continuous current turbine 11 is directly coupled with the air compressor 3, so that the explosion turbine 1 is relieved of part of its load when the turbine 11 is put into operation. After developing power in the turbine 11, the gases are discharged in completely exhausted condition by the exhaust conduit 12.

The waste heat of the explosion turbine 1 is utilized in a boiler 34 for generating steam, such heat being abstracted from the explosion turbine, which includes the explosion chambers thereof, by cooling oil. This construction is clearly shown in Fig. 3. A plurality of constant volume chambers 1a are associated with the rotor 5 of the explosion turbine 1, such chambers being each provided with a hydraulically operated air valve 24 and an outlet or nozzle valve 26. These valves are operated at the proper instants by a hydraulic controller of any suitable construction (see for example my United States patents Nos. 877,194 and 1,763,154). As such controller forms no part of the present invention it need not be described in detail.

Fuel is periodically introduced into each of the chambers by a fuel nozzle 27 by a suitable pump (not shown), and at the proper instant, all of the valves being closed, the explosive mixture in a chamber is ignited by a spark plug 28 or other suitable ignition device. The outlet valve 26 is then opened and the gases discharged through an expansion nozzle 29 against the rotor 5, the gases being expanded in the nozzle to a pressure considerably above atmospheric (several atmospheres).

The explosion chambers and likewise the turbine housing are provided with cooling jackets 29a through which flows a body of oil introduced by the conduit 30. The heated oil is withdrawn by the conduit 31 and forced by the pump 32 through the tubes 33 of the boiler 34. The boiler is fed by conduit 34a with water which has preferably been pre-heated. The steam collecting in the dome 34b is withdrawn by the pipe 35 and fed through the valve 32 to the superheating coil 8. The rate at which the oil is circulated through the boiler may be so controlled that the oil enters the boiler at about 260° C. and leaves the same at about 220° C; steam being generated in the boiler at about 20 atmospheres.

When an excess of compressed air is produced in the compressor 3, as when the engine is idling, such excess may be discharged through pipe 3a and valve 23 into the turbine 11 and utilized therein.

In the arrangement shown in Fig. 2, the exhaust gases are employed indirectly to assist in driving the auxiliary mechanism; that is they are employed to generate steam which is then utilized to generate power for the air compressor. The parts 1, 2, and 4 correspond to the similarly designated parts shown in Fig. 1. When the vehicle is under load, the exhaust gases, which, as in the arrangement shown in Fig. 1, have generated enough power in the rotor 5 of the explosion turbine to drive the compressor 3, flow through conduit 6 and past the suitably adjusted control device 7 into the heat exchanger 8. From the latter they are conveyed by conduit 9 to the continuous current gas turbine 13, which develops power for driving the vehicle and is connected with the driving wheels of the latter through the transmission 14. The spent combustion gases exhausting from the turbine 13 are discharged into the atmosphere through conduit 15. In order to utilize the exhaust gases economically when the continuous current turbine 13 is under partial or no load, the control device 7 is adjusted to the position in which the exhaust gases are permitted to enter the heat exchanger 16. The conduits for the gases in the heat exchanger are preferably in the form of Venturi nozzles, as shown, so that favorable conditions for heat interchange are provided without producing any undesirable counter pressure against the explosion turbine 1.

The completely deenergized exhaust gases are discharged into the atmosphere through conduits 17. The generated steam is withdrawn from the heat exchanger 16 by conduit 18 and conducted by conduit 19 to an auxiliary steam turbine 20 which is coupled with the compressor 3. In this case also the explosion turbine 1 is relieved of a corresponding amount of load through the cooperation of the auxiliary steam turbine 20.

In both forms of the invention illustrated, the control device or valves 7 are so constructed that they can be adjusted to assume intermediate positions between their end positions corresponding to full load and no load on the expansion machines 10 or 13 which are directly geared to the locomotive drive, such intermediate positions corresponding to the partial load at any moment on the expansion machines.

It is within the scope of the invention for the heat exchanger 16 to be employed not only for the generation of steam which is to be immediately utilized, but also, by the provision of a large steam collecting space for the storage or accumulation of steam in known manner. Upon subsequent subjection of the expansion machines to load, the generated and accumulated steam is utilized in the steam section of such machines for taking up such load, together, if desired, with the steam generated with the other waste heat of the turbine, such as that absorbed by the cooling agent flowing through the cooling jackets with which the explosion chambers are provided.

I claim:

1. A portable power plant comprising an explosion turbine including a constant volume explosion chamber, an expansion nozzle for expanding the intermittent puffs of gases discharged by said chamber to a pressure considerably above atmospheric, and an impulse rotor arranged to be driven by the gases discharging from said nozzle, an air compressor coupled with said turbine to be driven thereby, a conduit for conducting compressed air from the compressor to the explosion chamber, an elastic fluid engine for driving the vehicle, a conduit for conducting the exhaust combustion gases from said turbine to said engine, a valve associated with said last-mentioned conduit, a gas conduit adapted to lead away exhaust gases from said impulse rotor, means connected with said last-mentioned gas conduit for utilizing the gases as they are fed by said last-mentioned gas conduit, and ultimately discharging the deenergized gases into the atmosphere, and control mechanism for said valve operable to adjust the valve to admit all of said exhaust gases from said turbine to said engine when the latter is under heavy load, and to adjust the valve to cut off said engine from part or all of said exhaust gases and to deflect such gases into said last-mentioned gas conduit to said other gas utilzing means when said engine is under partial or no load.

2. A portable power plant comprising an explosion turbine including a constant volume explosion chamber, an expansion nozzle for expanding the intermittent puffs of gases discharged by said chamber to a pressure considerably above atmospheric, and an impulse rotor arranged to be driven by the gases discharging from said nozzle, an air compressor coupled with said turbine to be driven thereby, a conduit for conducting compressed air from the compressor to the explosion chamber, an elastic fluid engine for driving the vehicle, a conduit for conducting the exhaust combustion gases from said turbine to said engine, auxiliary apparatus associated with said explosion turbine and assisting the same in driving said compressor, a valve associated with said last-mentioned conduit, a gas conduit arranged to lead exhaust gases from said impulse rotor to said auxiliary apparatus, said gases flowing from said apparatus into the atmosphere, and control mechanism for said valve operable to adjust the valve to admit all of said exhaust gases from said turbine to said engine when the latter is under heavy load, and to adjust the valve to cut off from said engine part or all of said exhaust gases and to deflect such gases to said auxiliary apparatus when said engine is under partial or no load.

3. A power plant as set forth in claim 2, wherein said auxiliary apparatus comprises a continuous current gas turbine coupled to said compressor.

HANS HOLZWARTH.